T. J. VANDERHEIDEN.
APPARATUS FOR UTILIZING WELLS AND THE LIKE AS REFRIGERATORS.
APPLICATION FILED DEC. 2, 1911.
1,033,499.
Patented July 23, 1912.
2 SHEETS—SHEET 2.
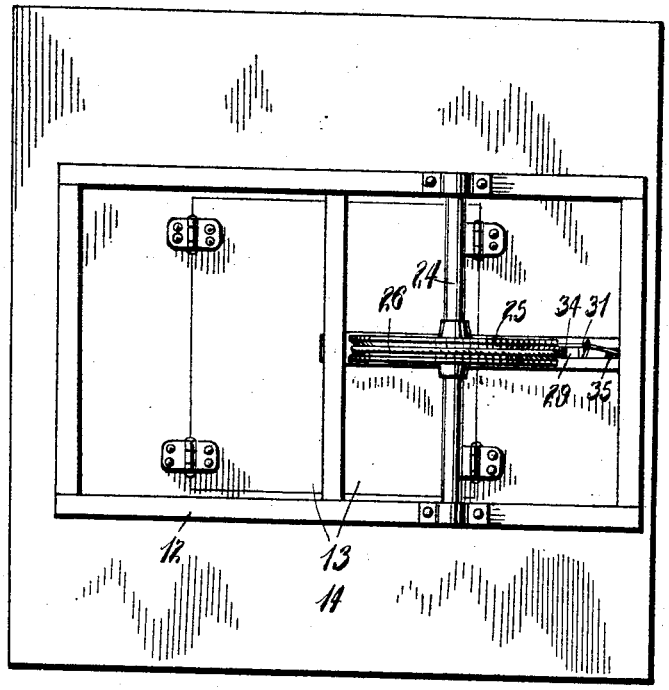
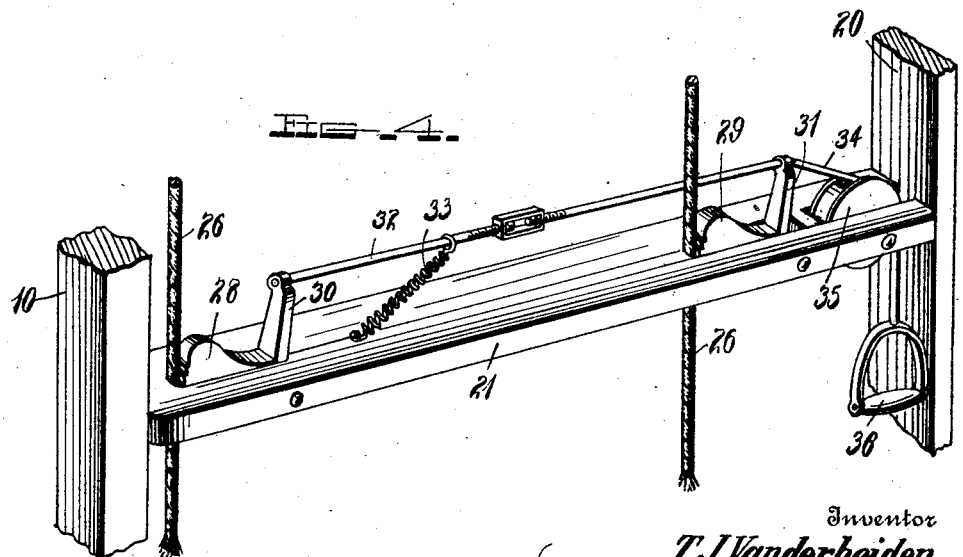

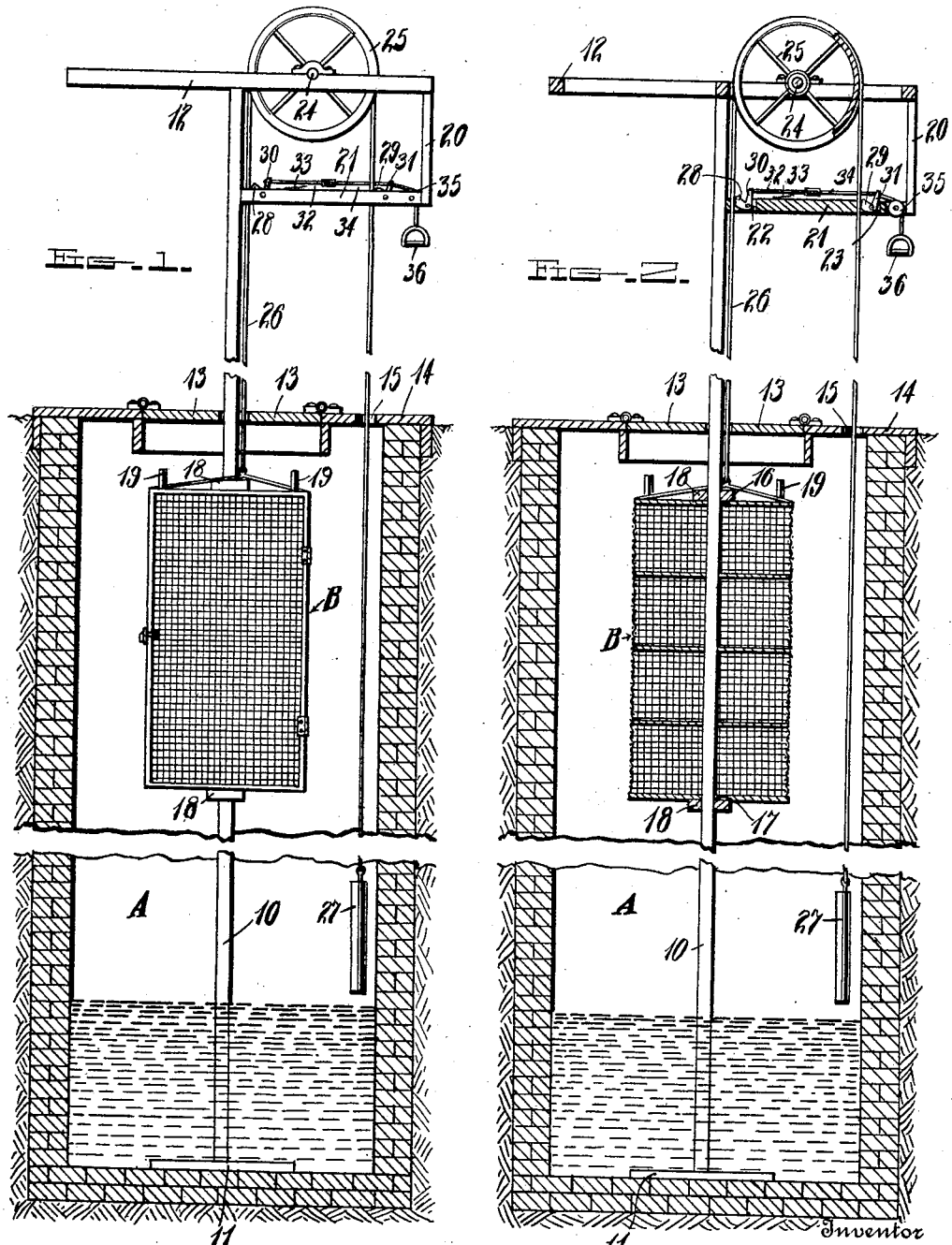

UNITED STATES PATENT OFFICE.

THEODORE J. VANDERHEIDEN, OF HUMPHREY, NEBRASKA.

APPARATUS FOR UTILIZING WELLS AND THE LIKE AS REFRIGERATORS.

1,033,499.  Specification of Letters Patent.  Patented July 23, 1912.

Application filed December 2, 1911. Serial No. 663,585.

*To all whom it may concern:*

Be it known that I, THEODORE J. VANDERHEIDEN, a citizen of the United States, residing at Humphrey, in the county of Platte, State of Nebraska, have invented certain new and useful Improvements in Apparatus for Utilizing Wells and the Like as Refrigerators; and I do hereby declare the following to be a full, clear, and exact description of the invention, such as will enable others skilled in the art to which it appertains to make and use the same.

This invention relates to apparatus for utilizing wells and the like as refrigerators.

The object of the invention resides in the provision of an apparatus of the character referred to which includes a food carrying member and means whereby said member may be elevated and lowered out of and into a well or other excavation, said member when lowered into the well being exposed to a temperature sufficiently low during all seasons of the year to preserve the food carried thereby over relatively long periods.

A further object of the invention resides in an improved form of elevating and lowering mechanism for the food carrying member which includes particularly a construction whereby the food carrying member may be stopped and held at any desired point in its up and down movement.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a view in elevation of the apparatus showing same applied to a well, the latter being disclosed in section, Fig. 2, a view similar to Fig. 1 showing the apparatus in vertical longitudinal section, Fig. 3, a plan view of what is shown in Fig. 1, and Fig. 4, a detail perspective view of the mechanism for controlling the descent of the food carrier and for locking the latter at any desired elevation with respect to the bottom of the well.

Referring to the drawings, 10 indicates a vertical guide rod the lower end of which terminates in a laterally extended portion 11 seated upon the bottom of the well, which latter is indicated at A. As will be apparent the guide rod 10 extends longitudinally of the well and projects a considerable distance above the upper end of the latter. If desirable a suitable housing is constructed over the upper end of the well A but in the illustration of the invention such housing is omitted to better disclose the apparatus. The upper end of the guide rod 10 has secured thereto a horizontal frame 12, which frame when a housing is constructed above the upper end of the well is adapted to be secured in any suitable manner to said housing. The upper end of the well A is adapted to be directly closed by means of oppositely opening trap doors 13 hinged in a suitable frame 14 which latter is provided with an opening 15 for a purpose that will presently appear.

The food carrier is indicated at B and is shown as comprising an adjustably shelved receptacle the side walls of which are constructed of a suitable foraminous material so that the cool air surrounding the carrier may circulate freely therein against the food. The top and bottom of the food carrier are provided with alining openings 16 and 17 respectively through which the guide rod 10 extends. The top and bottom of the food carrier are reinforced by bearing blocks 18 respectively which surround the openings 16 and 17, and through which the guide rod 10 slides.

Mounted upon each corner of the top of the food carrier respectively are vertically disposed fingers 19 which are adapted to engage the trap doors 13 during the ascent of the carrier and move said doors to open position. Depending from the frame 12 is a vertical arm 20 the lower end of which is secured to the guide rod 10 by means of a horizontal beam 21, said beam being provided with spaced openings 22 and 23. Journaled in the frame 12 is a shaft 24 which has fixed thereon a pulley 25. Traveling over this pulley 25 is a hoist cable 26 one end of which extends through the opening 22 in the beam 21 and is suitably secured to the food carrier B. The other end of this cable extends through the openings 23 and 15 and has secured thereto a counterbalancing weight 27 to assist in elevating the food carrier. By the construction so far described it will be apparent that when the hoist cable 26 is operated to rotate the pulley 25 in one direction the elevation of the food carrier will be effected, while gravity will serve to lower the food carrier and of course operate the hoist cable in the opposite direction.

In order to control the descent of the food carrier and also to lock said carrier at any desired elevation with respect to the bottom of the well the following structure is resorted to. Pivotally mounted for movement in the openings 22 and 23 are dogs 28 and 29 respectively which are adapted when moved in one direction to bind the cable 26 between same and the wall of the respective openings and thus lock said cable against movement under the influence of the weight of the food carrier. Formed integral with the dogs 28 and 29 are arms 30 and 31 respectively which are mutually connected at their free ends by a link 32. This link is connected at an intermediate point to one end of a spring 33 and the other end of this spring is anchored to the beam 21 in such manner that the spring constantly tends to move the link 32 toward the guide rod 10 and force the dogs 28 and 29 into binding relation to the cable 26. Secured to the free end of the arm 31 of the dog 29 is a pull cord 34 which travels on a pulley 35 journaled in the outer end of the beam 21, the free end of said pull cord having secured thereto a suitable gripping handle 36. Assuming that the food carrier has been elevated it will be apparent that the dogs 28 and 29 will be automatically operated so as to lock the hoist cable against movement and thus secure the food carrier in elevated position. Should it be desired to release the food carrier for descent under the influence of gravity it is only necessary to pull the cord 34 which will move the link 32 against the influence of the spring 33 and pivot the dogs 28 and 29 out of binding relation to the hoisting cable 26. Should it be desired to check the food carrier in its descent it is only necessary to release the link 32 to the influence of the spring 33 when the dogs 28 and 29 will be thrown automatically into binding relation to the hoist cable and lock the latter against further movement.

What is claimed is:

In a device of the class described, the combination of a guide rod supported upon the bottom of the well and extending longitudinally of the latter, a food receptacle slidably mounted on said rod, a frame supported at the upper end of the rod, a beam extending parallel to the frame one end of which is supported from said frame and the other end secured to the guide rod, said beam having a pair of spaced openings therein, a pulley journaled on said frame, a cable traveling on said pulley, and extending through the openings in said beam respectively, said cable having one end secured to the food carrier, a counter-balancing weight secured to the other end of said cable, dogs pivotally mounted in the openings in said beam respectively adapted to clamp said cable against movement when disposed in one position, means constantly tending to force said dogs to clamping position, and means for moving said dogs simultaneously from clamping position.

In testimony whereof, I affix my signature, in presence of two witnesses.

THEODORE J. VANDERHEIDEN.

Witnesses:
 F. W. HODGIN,
 A. H. BREUNIG.

Copies of this patent may be obtained for five cents each, by addressing the "Commissioner of Patents, Washington, D. C."